US 6,680,842 B1

(12) United States Patent
Pelaez et al.

(10) Patent No.: US 6,680,842 B1
(45) Date of Patent: Jan. 20, 2004

(54) FRONT MOUNT CIRCUIT BREAKER ASSEMBLY

(76) Inventors: Pedro R. Pelaez, 11960 NW. 87th Ct., Hialeah Gardens, FL (US) 33018; J. Thomas Johnston, 11960 NW. 87th Ct., Hialeah Gardens, FL (US) 33018

( * ) Notice: Subject to any disclaimer, the term of this patent is extended or adjusted under 35 U.S.C. 154(b) by 0 days.

(21) Appl. No.: 10/418,864

(22) Filed: Apr. 21, 2003

(51) Int. Cl.[7] .................................................. H02B 1/04
(52) U.S. Cl. ....................... 361/631; 361/634; 361/636; 361/647; 361/652
(58) Field of Search ................................ 361/631, 634, 361/636, 643, 646, 647, 652

(56) References Cited

U.S. PATENT DOCUMENTS

| | | | | |
|---|---|---|---|---|
| 4,646,199 A | * | 2/1987 | M'Sadoques et al. | 361/634 |
| 5,973,914 A | * | 10/1999 | Rose et al. | 361/627 |
| 5,978,209 A | * | 11/1999 | Montague et al. | 361/634 |
| 6,062,914 A | * | 5/2000 | Fasano | 439/716 |
| 6,064,018 A | * | 5/2000 | Seymour et al. | 200/293 |
| 6,416,702 B1 | * | 7/2002 | Montague et al. | 264/250 |
| 6,472,621 B2 | * | 10/2002 | Merlin et al. | 200/50.32 |

* cited by examiner

Primary Examiner—Boris Chervinsky
(74) Attorney, Agent, or Firm—J. Sanchelima; A. Bordas

(57) ABSTRACT

A front mount circuit breaker assembly for circuit breakers of different dimensions that are removably mounted to modular circuit breaker holder members. Elongated contacts extend from the terminals on the back of the circuit breakers to the front. The holder members have a through portion between the two ends. Below the two ends and inwardly, a supporting surface is defined for supporting electrical contacts where the distal ends of the elongated contacts are removably mounted to provide the electrical connection for the device. These connections have been brought to the front. The elongated contacts can be made of different dimensions that cooperate with those of the circuit breaker. The holder members are banked together and removably mounted over a cooperating longitudinal rib that is received within a bay cut out defined on the flat bottom wall of the holder members in one of the embodiments. Another embodiment includes outwardly extending flanges for ready mounting to a panel.

7 Claims, 6 Drawing Sheets

FRONT MOUNT CIRCUIT BREAKER ASSEMBLY

BACKGROUND OF THE INVENTION

1. Field of the Invention

The present invention relates to a front mount circuit breaker assembly, and more particularly, to such an assembly that is used with D.C. electrical systems.

2. Description of the Related Art

Many designs for circuit breaker panels have been designed in the past. None of them, however, include an assembly that permits a user to install and remove panelboard-mount circuit breakers from the assembly or panel where they are installed without requiring the disassembly of the assembly itself. Panel board mounted circuit breakers are popular devices for D.C. power system. Also, another feature of the present invention is that it accepts circuit breakers of different dimensions, interchangeably. Circuit breakers are manufactured with different ratings and dimensions. Sometimes finding the exact mechanical replacement becomes difficult. This feature enhances the versatility of the present invention.

SUMMARY OF THE INVENTION

It is one of the main objects of the present invention to provide a front mount circuit breaker assembly that allows a user to replace circuit breakers from the front without disassembling the complete panel.

It is another object of this invention to provide a front mount circuit breaker assembly that accepts panelboard-mount circuit breakers of different dimensions interchangeably.

It is still another object of the present invention to provide a front mount circuit breaker assembly with minimum exposure avoiding the possibility of electrical shocks or other damages.

It is another object of this invention to provide a front mount circuit breaker assembly that is mounted to a panel board assembly or to a rail mounted to a base plate.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
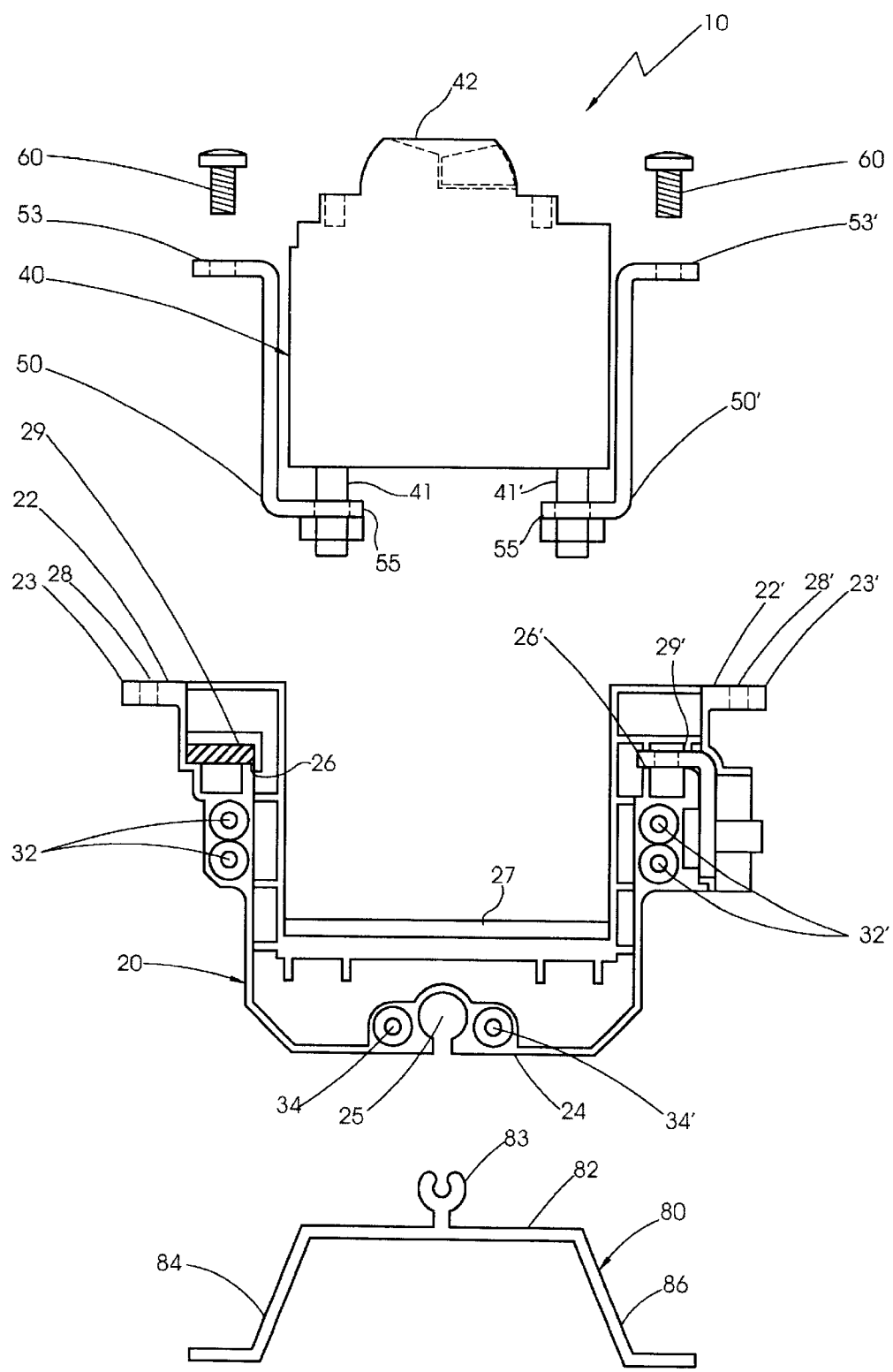
FIG. 1 represents an exploded front view of one of the preferred embodiments for the front mount circuit breaker assembly object of the present invention with a base assembly.
Figure 5:
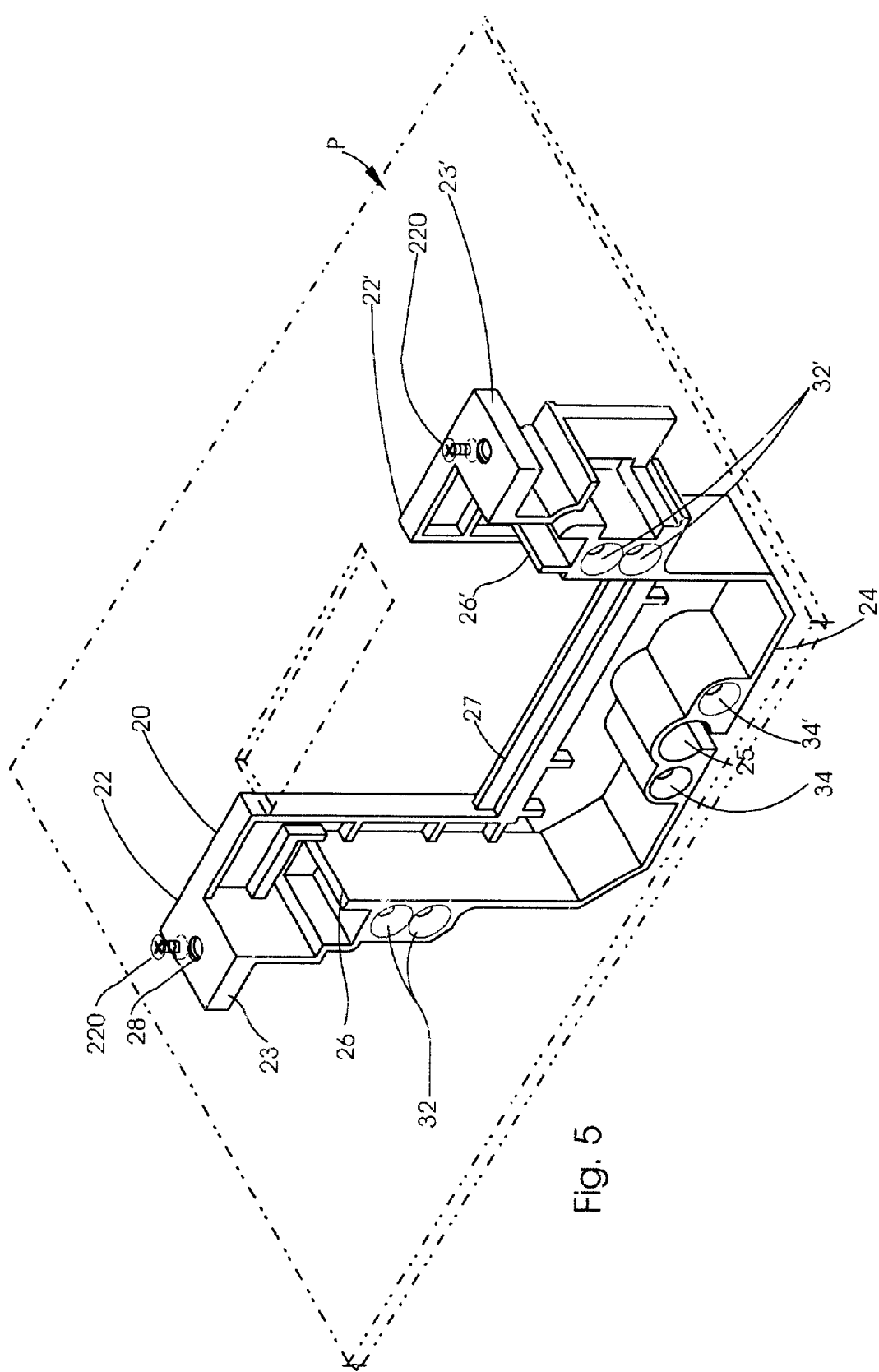
FIG. 5 shows an isometric view of another embodiment for the front mount circuit breaker assembly mounted to a panel.
Figure 6:
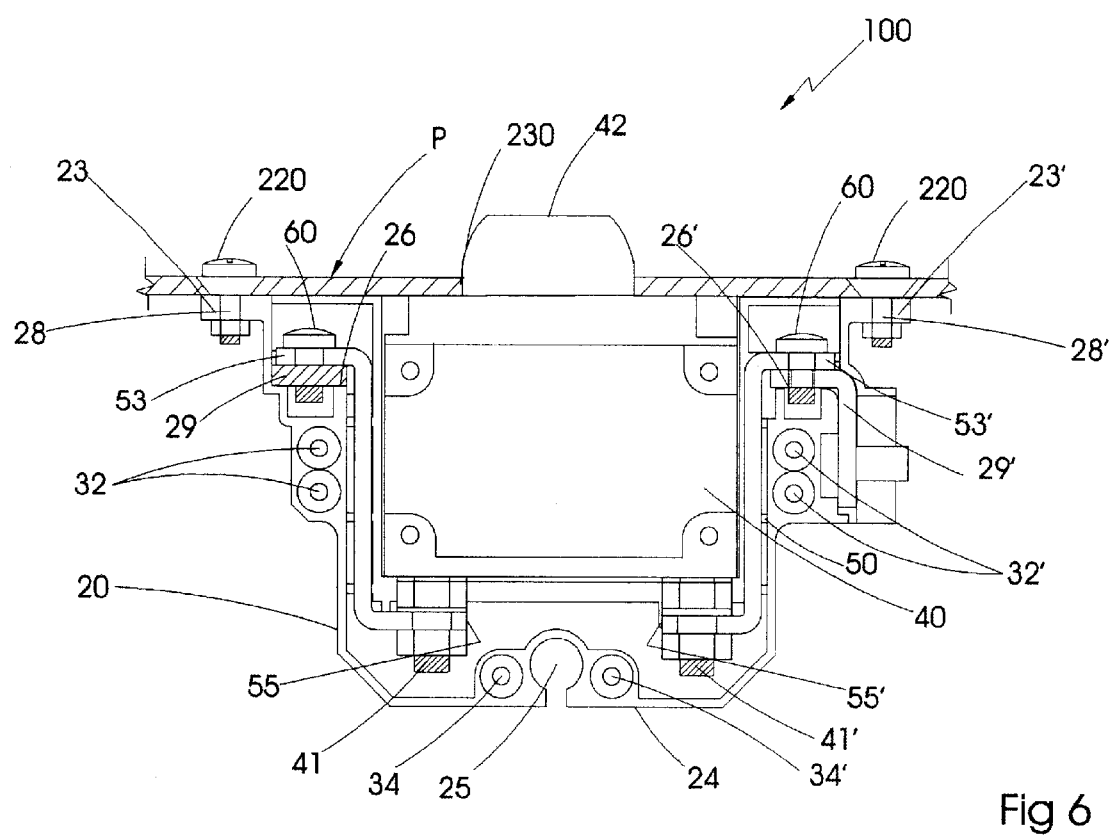
FIG. 6 shows a front elevational view of the embodiment represented in FIG. 5 with a circuit breaker mounted therein.

Referring now to the drawings, where the present invention is generally referred to with numeral 10, it can be observed that it basically includes modular circuit breaker holder members 20, fastening members 30, panelboard-mount circuit breakers 40 and 140, elongated contact members 50; 50'; 150 and 150' and end cap 70. Holder members 20 can be optionally mounted directly to panel P, as shown in FIGS. 5 and 6, or indirectly through rail base assembly 80 mounted to a flat area F, as seen in FIG. 1.

Figure 3:
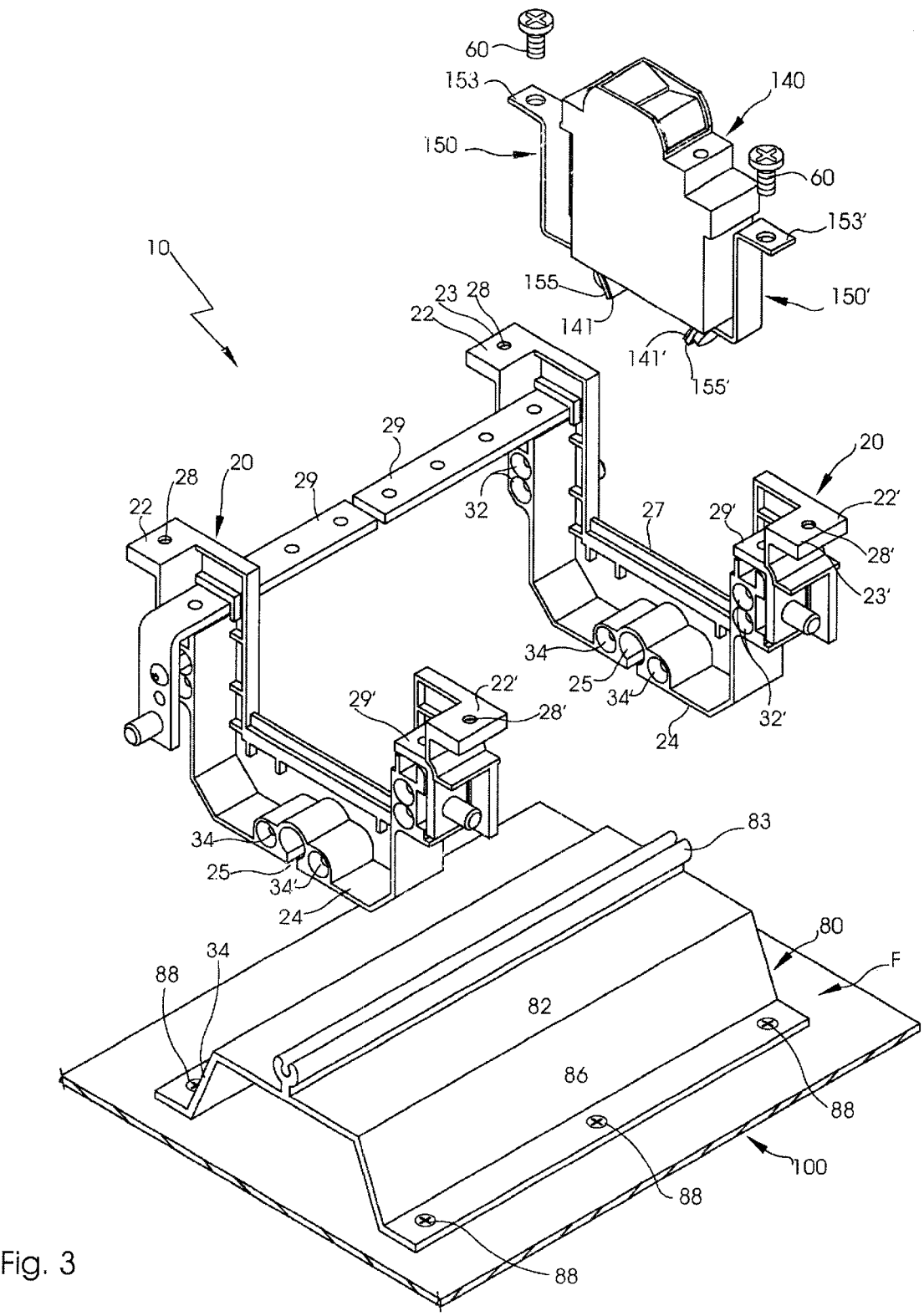
FIG. 3 is an exploded isometric view of the embodiment represented in FIG. 1 where two modular circuit breaker holder members are kept together by an electrical bus bar.
Figure 4:
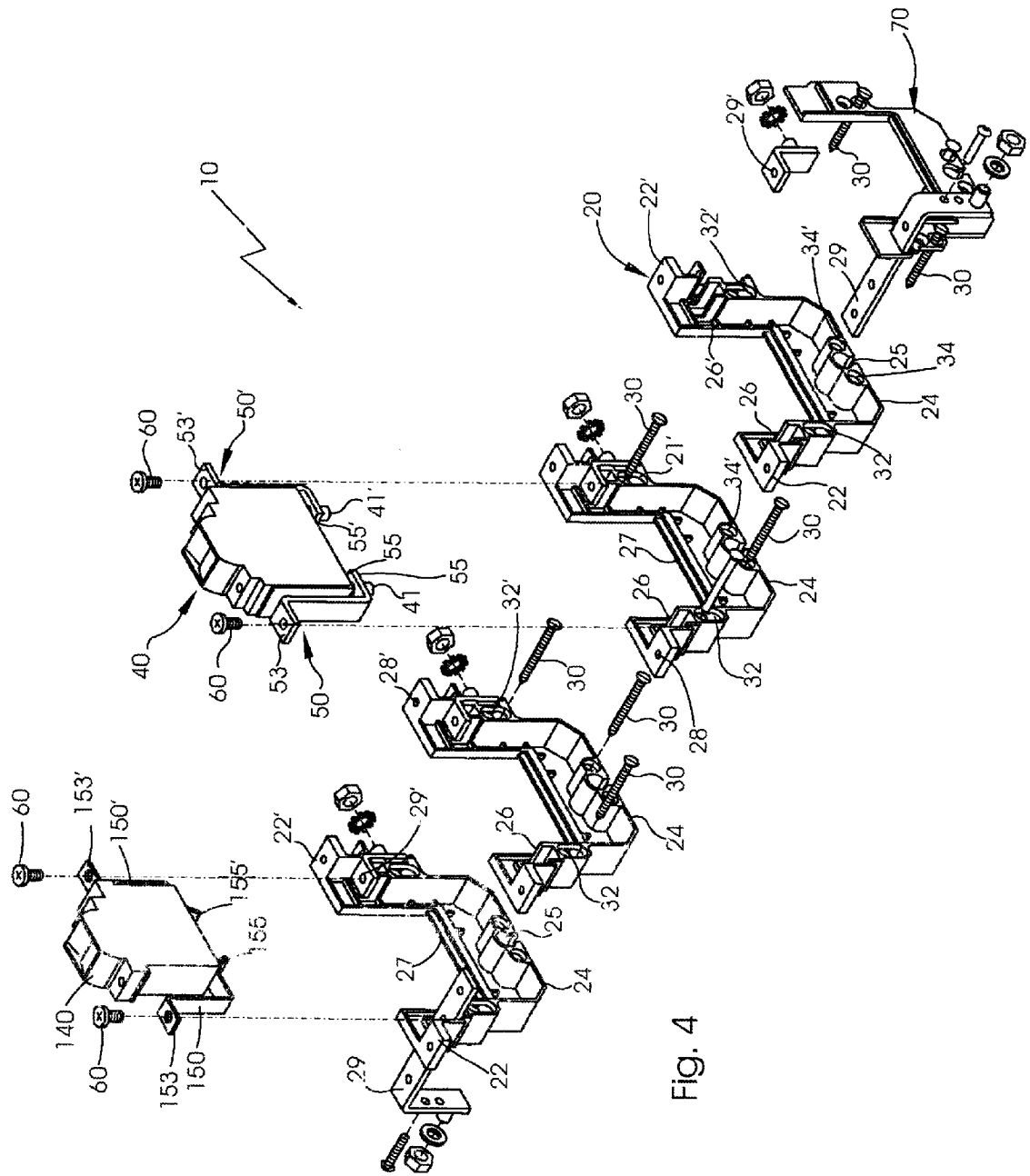
FIG. 4 is an exploded isometric view of some modular circuit breaker holder members.

Breaker holder members 20 are preferably stacked together with fastening members 30 that pass through openings 32, 32', 34 and 34', as best seen in FIGS. 3 and 4. Panelboard-mount circuit breakers 40 include terminals 41 and 41' with elongated contact members 50 and 50' removably mounted thereto, at ends 55 and 55'. Elongated contact members 50 and 50' extend peripherally along panelboard-mount circuit breaker 40 toward front end 42 of circuit breaker 40. The other ends 53 and 53' extend outwardly a cooperative distance to be removably and electrically connected to contacts members 29 and 29' resting on supporting surfaces 26 and 26' of holder 20. Electrical contact member 29 is an electric bus bar. Electrical contact member 29' has an inverted L-shape, as shown in FIGS. 3 and 4. Contact members 50 and 50' conform, dimensionally, to the physical characteristics of holder members 20 to ensure that ends 53 and 53' coincide with supporting surfaces 26 and 26' and electrical contact members 29 and 29'. Fastening members 60 removably secure ends 53 and 53' to electrical contact members 29 and 29' respectively, making the assembly and disassembly of contact members 50 and 50' accessible from the "front".

Figure 2:
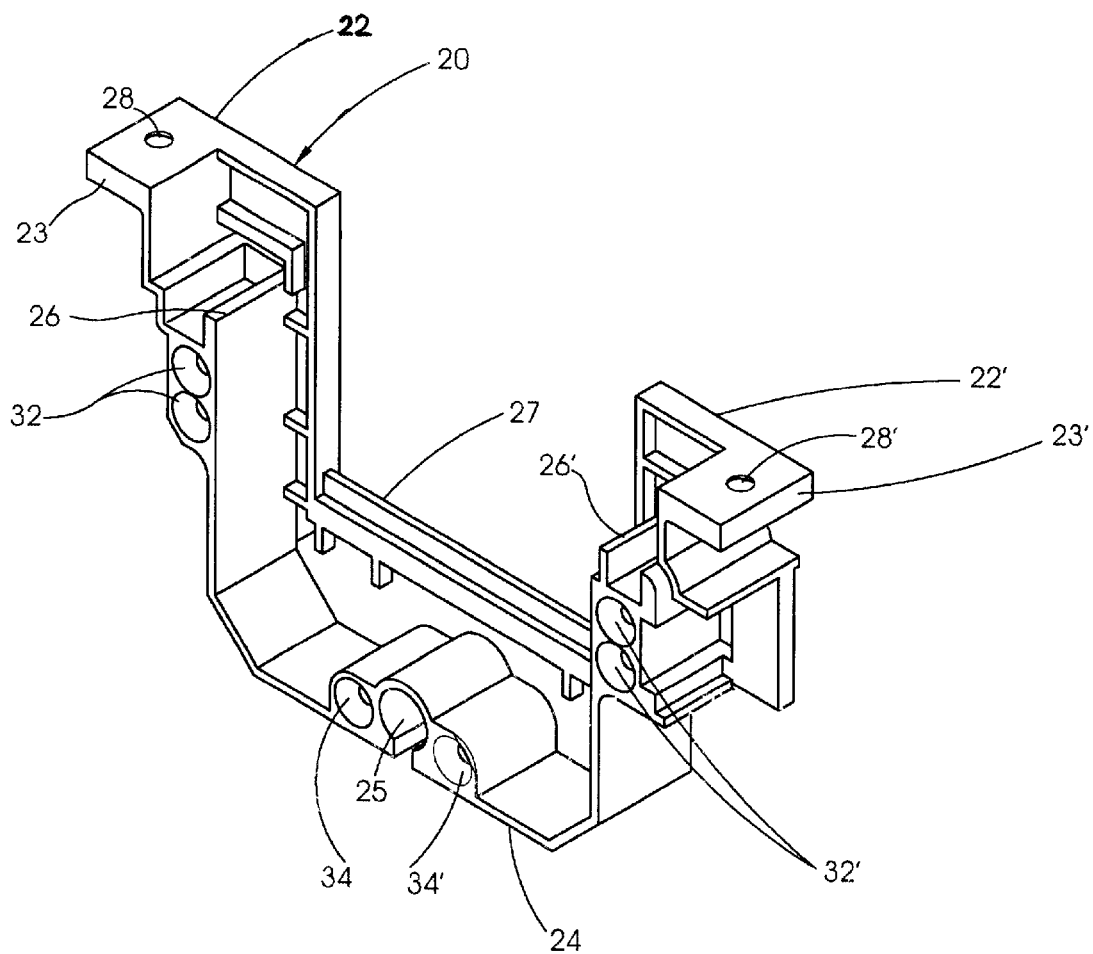
FIG. 2 shows an isometric view of a modular circuit breaker holder member.

As seen in FIG. 2, modular circuit breaker holder members 20 has a cooperative shape to embrace a panelboard-mount circuit breaker 40. Modular circuit breaker holder members 20 have cooperative dimensions to receive panelboard-mount circuit breakers 40 therein. Each modular holder member 20 includes upper ends 22 and 22' and a through portion 27 in between. Each modular holder member 20 may also include circuit breaker supporting surfaces 26 and 26' extending horizontally below ends 22 and 22', respectively. Each modular holder member 20 also includes bay cut out 25 cooperatively disposed at the center of flat bottom wall 24, as best seen in FIG. 1, and this is intended for use with rail base assembly 80.

Modular circuit breaker holder members 20 hold circuit breakers of different dimensions, as shown in FIGS. 3 and 4. Panelboard-mount circuit breaker 140 includes terminals 141 and 141' with elongated contact members 150 and 150' removably mounted thereto, at ends 155 and 155', as best seen in FIG. 3. Similarly to panelboard-mount circuit breaker 140, the other ends 153 and 153' of contact members 150 and 150' are removably and electrically connected to electrical contact members 29 and 29' resting on supporting surfaces 26 and 26' of holder 20. Fastening members 60 removably secure ends 153 and 153' to supporting surfaces 26 and 26', respectively.

As shown in FIG. 4, end cap 70 has a cooperative structural shape to coincide with the shape of holder member 20. End cap 70 closes the structure when a predetermined amount of holder members 20 have been stacked together.

Rail base assembly 80 extends longitudinally and receives modular circuit breaker holder members 20 forming a bank or group. This option of mounting holder members 20 to assembly 80 permits a designer to removably mount circuit breaker assembly 10 to flat area F. as seen in FIG. 3. Rail base assembly 80 is mounted to flat area F with fastening members 88. Rail base assembly 80 includes longitudinal flat wall 82 and longitudinal legs 84 and 86. Longitudinal flat wall 82 includes longitudinal rib 83 extending upwardly. Modular holder members 20 mount to rail base assembly 80 by slidably inserting longitudinal rib 83 through bay cut out 25. Bay cut 25 may have different configurations. The one represented in the drawings includes a narrow portion and an enlarged portion that slidably receive longitudinal neck and protrusion of longitudinal rib 83. Flat bottom wall 24 coacts with longitudinal flat wall 82 that provides mechanical stability preventing any rocking movement.

Another option provides holder members 20 with flange members 23 and 23' that extend outwardly from upper ends 22 and 22'. This permits the mounting of holder members 20 to panel P with fastening members 220 through openings 28 and 28', as shown in FIGS. 5 and 6.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A circuit breaker assembly comprising:
    A) at least one modular circuit breaker holder member having a cooperative shape to embrace a circuit breaker, each of said modular circuit breaker holder member including first and second ends and a through portion inbetween, and first and second supporting surfaces inwardly positioned below said first and second ends and said first and second supporting surfaces including first and second electrical contact members;
    B) a panelboard-mount circuit breaker for each of said holder members having first and second terminals and a front end;
    C) two elongated contact members for each of said circuit breakers, each having third and fourth ends, said third ends being connected to said first and second terminals, and said elongated contact members extend peripherally along said panelboard-mount circuit breaker toward said front end, and said fourth ends extending outwardly a cooperative distance to be removably mounted to said first and second electrical contact members; and
    D) first fastening means for removably keeping said fourth ends mounted to said first and second electrical contact members.

2. The circuit breaker assembly set forth in claim 1, further including:
    E) second fastening means for keeping said at least one modular circuit breaker holder members stacked together and in abutting relationship with respect to each other.

3. The circuit breaker assembly set forth in claim 2, further including:
    F) an elongated rail base assembly removably mounted to a flat area and including means for removably mounting said modular circuit breaker holder members to said rail base assembly, said rail base assembly includes a longitudinal flat wall that is kept at a parallel and spaced apart relationship with respect to said flat area.

4. The circuit breaker assembly set forth in claim 3 wherein said through portion of said modular circuit breaker holder member includes a substantially flat bottom wall with a bay cut out formed thereon and said elongated rail base assembly includes a cooperating longitudinal rib that is slidably received within said bay cut out and with said flat bottom wall coacting with said flat bottom wall to keep said holder member mounted thereon in abutting relationship with respect to each other.

5. The circuit breaker assembly set forth in claim 1 wherein said modular circuit breaker holder member includes first and second flange members that extend outwardly from said first and second ends and said modular circuit breaker holder member further including panel fastening means for securing said first and second flange members to a panel.

6. A circuit breaker assembly comprising:
    A) at least one modular circuit breaker holder member having a cooperative shape to embrace a circuit breaker, each of said modular circuit breaker holder member including first and second ends and a through portion inbetween, and first and second supporting surfaces inwardly positioned below said first and second ends and said first and second supporting surfaces including first and second electrical contact members;
    B) a panelboard-mount circuit breaker for each of said holder members having first and second terminals and a front end;
    C) two elongated contact members for each of said circuit breakers, each having first and second ends, said first ends being connected to said first and second terminals, and said elongated contact members extend peripherally along said panelboard-mount circuit breaker toward said front end, and said second ends extending outwardly a cooperative distance to be removably mounted to said first and second electrical contact members;
    D) first fastening means for removably keeping said second ends mounted to said first and second electrical contact member; and
    E) second fastening means for keeping said at least one modular circuit breaker holder members stacked together and in abutting relationship with respect to each other.

7. The circuit breaker assembly set forth in claim 6, further including:
    F) an elongated rail base assembly removably mounted to a flat area and including means for removably mounting said modular circuit breaker holder members to said rail base assembly, said rail base assembly includes a longitudinal flat wall that is kept at a parallel and spaced apart relationship with respect to said flat area.

* * * * *